United States Patent

[11] 3,629,615

[72] Inventor David Gurwicz
 Gateshead, England
[21] Appl. No. 736,136
[22] Filed June 11, 1968
[45] Patented Dec. 21, 1971
[73] Assignee Sevcon Engineering Limited
[32] Priority June 14, 1967
[33] Great Britain
[31] 27,413/67

[54] CURRENT-LIMITING MEANS FOR DC PULSE-CONTROLLED CIRCUITS
 11 Claims, 4 Drawing Figs.
[52] U.S. Cl. .................................................. 307/252 M,
 315/340, 318/345, 321/45, 323/22 SC
[51] Int. Cl. .............................................. H03k 17/00
[50] Field of Search .................................... 307/252,
 284, 305; 315/340; 328/210; 323/22 SC; 321/45;
 318/331, 345

[56] References Cited
 UNITED STATES PATENTS
 3,177,417 4/1965 Wright .......................... 318/345 X
 3,249,840 5/1966 Eriksson et al. .............. 318/345 X
 3,323,036 5/1967 Runyan ......................... 307/252 X Primary Examiner—Donald D. Forrer
Assistant Examiner—John Zazworsky
Attorney—Sughrue, Rothwell, Mion, Zinn & Macpeak ABSTRACT: A static switching controller for repetitively connecting to, and disconnecting from, a load of a DC source, the circuit of the load of the source possessing inductance, comprises thyristor means, energizable to connect the load of the source, and a commutating capacitor for switching off the thyristor means, wherein there are provided sensing means which senses a voltage dependent upon the current passing through the thyristor means on commutation thereof and circuit elements which, when said voltage sensed by the sensing means exceeds a predetermined value, are operative to effect limitation of the main current flowing through the load by reducing the ratio of conducting to nonconducting time of the thyristor means.

ns for connection with the load and the source so that
CURRENT-LIMITING MEANS FOR DC PULSE-CONTROLLED CIRCUITS This invention relates to static switching controllers for effecting repetitive connection to and disconnection from a load of a DC source, the circuit of the load and the source possessing inductance. The inductance of the circuit of the load and the source may be inherent or both inherent and introduced inductance. More particularly the invention is concerned with such controllers of the kind comprising thyristor means for connection with the load and the source so that when it is rendered conducting current flows from the source through the load, the periods of conduction of the thyristor means determining the mean current through the load, and a commutating capacitor for switching off the thyristor means and adapted to be forward charged from the source and to reverse-bias the thyristor means to terminate conduction thereof.

Static switching controllers of the kind set forth are now widely used as the link between the battery and traction motor of battery electric vehicles. It is most desirable in this context to ensure that the equipment cannot be overloaded under any condition of operation.

As is well known the stray inductances of the battery and its leads charges the commutating capacitor of the controller to a voltage above the level of the battery on termination of conduction through the thyristor means. This phenomenon is fully explained in our British Pat. No. 950,734. The relationship which exists between current flowing through the thyristor means on turn off thereof is given by $$\tfrac{1}{2}LI^2 = \tfrac{1}{2}CV_P^2 - \tfrac{1}{2}CV_B^2$$

therefore, $I^2 = C/L\,(V_P^2 - V_B^2)$

In this latter equation $C$ equals the capacitance in microfarads of the commutating capacitor, $L$ is the value in microhenries of the stray inductance, $I$ is the current in amperes flowing through the thyristor means on commutation thereof, $V_B$ is the battery voltage and $V_P$ is the voltage to which the commutating capacitor charges and therefore the voltage at the anode of the thyristor means on commutation of the latter.

It will therefore be apparent that assuming the battery voltage is constant each value of $V_P$ which is obtained relates to a corresponding value for the current $I$. An object of the invention is to provide a static switching controller of the kind set forth in which the dependence on load current of the voltage appearing, on commutation of the thyristor means, in the circuit of the thyristor means the DC source and the load is utilized to effect mean current limitation.

According to the present invention, in a static switching controller of the kind set forth, there are provided sensing means which senses a voltage dependent upon the current passing through the thyristor means on commutation thereof and circuit elements which, when said voltage sensed by the sensing means exceeds a predetermined value, are operative to effect limitation of the mean current flowing through the load by reducing the ratio of conducting to nonconducting time of the thyristor means.

Suitably, the sensing means are adapted to sense a voltage in the circuit of the load, the DC source and the thyristor means on commutation of the thyristor means.

Advantageously, the sensing means includes a multiturn coil disposed in close proximity to a section of the leads of the DC source, the voltage induced in the coil on commutation of the thyristor means being employed when in excess of a predetermined value to operate control circuit elements which so control the pulsing frequency of an oscillator as to reduce the ratio of conducting to nonconducting time of the thyristor means.

In one form of the invention the sensing means are adapted to sense the voltage at the anode of the thyristor means on commutation of the thyristor means.

In another form of the invention the sensing means are adapted to sense the difference between the voltage at the anode of the thyristor means on commutation of the thyristor means and the voltage of the DC source.

In a further form of the invention the controller has means for reversing the forward charge on the commutating capacitor, means for preventing decay of charge on the commutating capacitor and further thyristor means which are rendered conducting to discharge the reverse charge on the commutating capacitor and thereby to commutate the thyristor means connecting the load to the DC source, and the sensing means are adapted to sense the voltage of the reverse charge on the commutating capacitor.

The invention will now be described, by way of example, with reference to the accompanying drawings in which.

Throughout the drawings like parts have been given the same reference numerals.

Figure 1:
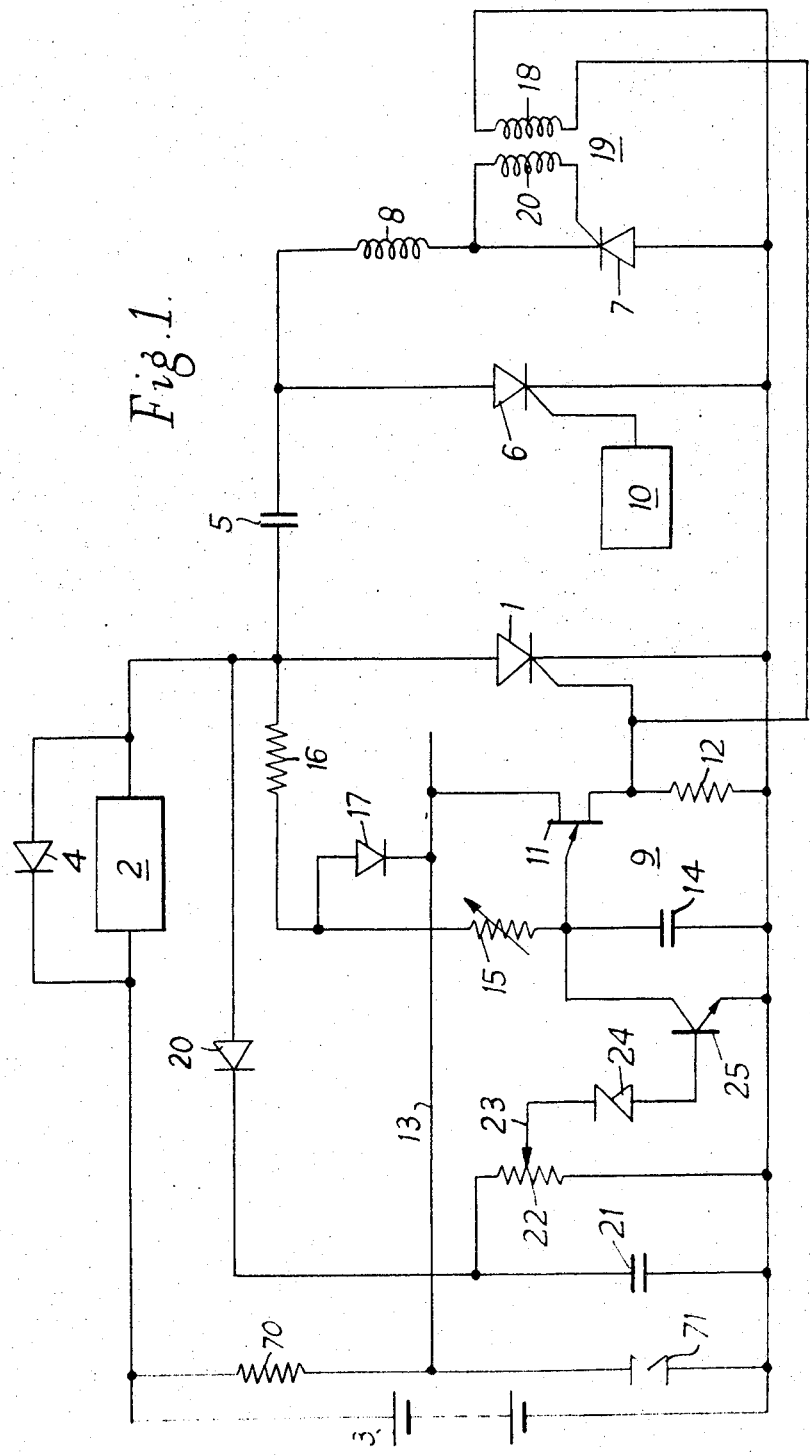
FIG. 1 is a circuit diagram of a static switching controller according to one embodiment of the invention.

Referring first to FIG. 1 a main switching thyristor 1 is connected in series with a load 2, suitably, a DC series traction motor of a battery electric vehicle, and a battery 3. The load 2 is an inductive load shunted by the usual flywheel diode 4. Connected in parallel with the main switching thyristor 1 is a commutating capacitor 5 and a second or turnoff thyristor 6, while shunting the turnoff thyristor 6 is a third or reversal thyristor 7 in series with an inductor 8. The main thyristor 1 has a gate electrode to which pulses are supplied from an oscillator 9 in order to render the main thyristor conducting. An oscillator 10 of any suitable known form supplies pulses to the gate of the turnoff thyristor 6 so as to render that thyristor conducting at respective fixed time intervals after the main thyristor 1 has been rendered conducting by pulses supplied to its gate.

The circuit elements so far described constitute the power circuit of the arrangement which operates in the following manner. If thyristor 1 is in its nonconducting mode of operation no power is supplied from the battery 3 to the load 2. If a pulse is first supplied from the oscillator 10 to the gate of thyristor 6, the commutating capacitor 5 is forward charged by way of the battery and the load 2. The falling current which arises as the commutating capacitor becomes fully charged results in current flow through thyristor 6 falling below a level sufficient to hold that thyristor in conduction and the thyristor is thus turned off. If the current level does not go below that sufficient to hold the thyristor 6 in conduction, the next firing of thyristor 1 commutates thyristor 6. A pulse is now supplied to the gate of thyristor 1 which therefore is rendered conducting and so connects the battery 3 to the load 2 so that current is drawn from the battery by the load.

Thyristor 7 is fired with thyristor 1 with the result that thyristors 1 and 7 and inductor 8 provide a reversal path for the commutating capacitor 5, the charge on which therefore reverses. The tendency of the reverse charge on the commutating capacitor 5 to flow in the opposite sense through the reversal path causes turnoff of the thyristor 7. The turnoff thyristor 6 is now fired by a pulse to its gate from oscillator 10. The charge on the commutating capacitor thus discharges through thyristor 6 effecting turnoff of the main thyristor 1 whereupon the commutating capacitor again forward-charges inductively from the battery 3, decay of the charge on the commutating capacitor 5 being at this stage prevented because thyristor 7 is in its nonconducting mode. It may in certain instances be desirable in order to achieve a desired level of forward charge on the capacitor to add inductance in series with the source. In general therefore the circuit of the load and the source (be the source a battery or other DC source) may possess simply inherent inductance or both inherent and added inductance. The oscillator 9 comprises a unijunction transistor 11 having one of its base electrodes connected by way of a resistor 12 to the negative side of the battery while its other base electrode is connected to a rail 13 which is at a fixed voltage below the battery voltage, the voltage of rail 13 being determined by the network of resistor 70 and zener diode 71. The emitter of the unijunction transistor 11 is connected by way of a variable resistor 15 and fixed resistor 16 of very much smaller value than resistor 15 to the anode of the main switching thyristor 1. The variable resistor 15 has its wiper arm mechanically connected to a movable control, suitably, the foot pedal of a battery-driven electric vehicle. A diode 17 is connected from the junction of variable resistor 15 and fixed resistor 16 to the rail 13. In the event of the junction point between variable resistor 15 and fixed resistor 16 tending to rise above the potential of the voltage rail 13, the diode 17 is rendered conducting so that this diode has the function of holding the junction point of resistors 15 and 16 at substantially the potential of the rail 13. The common point of resistor 12 and the gate electrode of the main switching thyristor 1 is connected to one end of the primary winding 18 of a pulse transformer 19, the other end of winding 18 being connected to battery negative. A secondary winding 20 of the pulse transformer 19 is connected between the gate and cathode electrodes of the reversal thyristor 7. Accordingly, whenever a pulse is supplied from the oscillator 9 to the gate of the main switching thyristor 1 a pulse is simultaneously supplied by way of the pulse transformer 19 to the gate of thyristor 7.

The oscillator 9 operates in the following manner. The capacitor 14 charges by way of fixed resistor 16 and variable resistor 15 to a level at which it effects turning on of the unijunction transistor 11, whereupon the capacitor discharges through a unijunction transistor 11 and resistor 12. The capacitor 14 then recharges by way of resistors 15 and 16 and the cycle repeats so that current pulses pass through resistor 12 at a rate dependent upon the time constant which, since resistor 16 is much smaller than resistor 15 depends primarily on capacitor 14 and resistor 15.

Included in the circuit are sensing means which sense the voltage across the main switching thyristor 1 when the latter is commutated. To this end, there is provided connected between the anode and cathode of the main switching thyristor 1 a diode 20 in series with a capacitor 21, the latter being shunted by a resistor 22. A proportion of the voltage which appears across the resistor 22 is determined by the position of a preset wiper arm 23 which is connected by way of a zener diode 24 to the base of an NPN-transistor 25. The emitter of transistor 25 is connected to the negative side of the battery while its collector is connected to the common point of capacitor 14 and resistor 15.

The operation of the voltage-sensing means can now be appreciated. When the main switching thyristor 1 is commutated by thyristor 6, a voltage transient pulse appears across the main switching thyristor 1 which increases the anode voltage of the thyristor by the amount of the amplitude of the transient pulse. The capacitor 21 charges by way of diode 20 to the increased anode voltage of the main switching thyristor and the voltage drop across the resistor 22 also therefore increases by the same amount. The voltage at this time at the preset wiper arm of the resistor 22 may or may not exceed the breakover voltage of the zener diode 24. If it does exceed the breakover voltage of the zener diode 24, the base of transistor 25 goes positive with respect to its emitter and the transistor is switched into conduction thereby short-circuiting capacitor 14. Thus while transistor 25 conducts, the short-circuiting of capacitor 14 causes the relaxation oscillator 9 to be held in a quiescent condition with the result that the next pulse supplied to the gate of thyristor 1 and also therefore to the gate of thyristor 7 is delayed. The transistor 25 thus provides a control circuit for the oscillator 9 and therefore for the main power circuit.

After the transient voltage pulse has appeared at the anode of thyristor 1 the voltage at that anode falls back to the voltage of the positive side of the battery 3 and the capacitor 21 discharges through resistor 22 until the voltage at the wiper arm 23 falls to a level below the breakover voltage of the zener diode 24 with the result that transistor 25 then ceases to conduct and oscillator 9 commences once again to supply pulses to the gate electrodes of thyristors 1 and 7. It will be understood that the amplitude of the transient voltage appearing at the anode of the main switching thyristor 1 on commutation of that thyristor is a function of the load current flowing on commutation of the thyristor 1. Thus, the greater the load current flowing on commutation the higher the voltage to which capacitor 21 charges on commutation of thyristor 1 and the longer it therefore takes for the voltage at wiper arm 23 to fall to a level below the zener diode breakover voltage at which level the transistor 25 is turned off. Accordingly, therefore, the higher the load current on commutation the longer is the relaxation oscillator 9 held in quiescent condition. It will be understood that there is a level of load current which flows at the time of commutation of thyristor 1 below which charging of capacitor 21 by the transient voltage pulse is insufficient to cause the voltage at the wiper arm 23 of resistor 22 to switch the transistor 25 into conduction and therefore bring the oscillator 9 to a quiescent state. This level of load current is the current limit point and any tendency for the load current to rise above the limit point results in delay in the supply of the next pulse to the gate electrodes of thyristors 1 and 7 so that the mean current through the load is appropriately reduced.

The circuit of FIG. 1 thus illustrates how the frequency of pulses to the gate electrode of the main switching thyristor 1 is reduced to reduce the mean current through the load.

Figure 2:
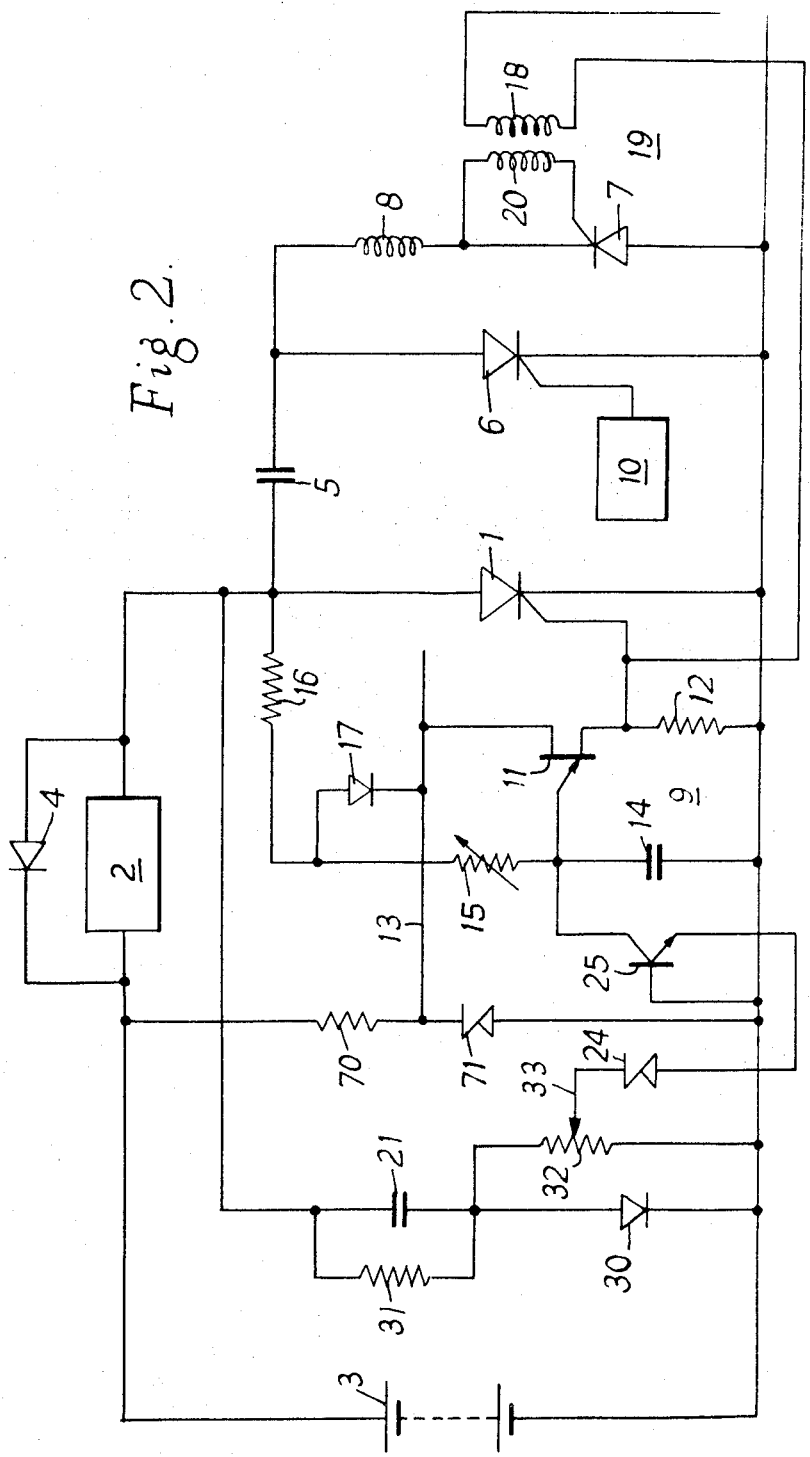
FIG. 2 is a circuit diagram of another embodiment of the invention.

Referring now to FIG. 2 the circuit therein illustrated differs from that of FIG. 1 in that one side of the capacitor 21 is connected directly to the anode of thyristor 1 while the other side of the capacitor is connected by way of diode 30 to the cathode side of thyristor 1. Capacitor 21 is shunted by a resistor 31 and diode 30 is shunted by a resistor 32 having a preset wiper arm 33 connected by way of the zener diode 24 to the emitter of NPN-transistor 25, the base of which is connected the the negative side of the battery.

The operation of the circuit of FIG. 2 is as follows:

On commutation of thyristor 1 capacitor 21 charges above battery positive voltage to a level equal to that of the amplitude of the inductive transient pulse which on commutation appears at the thyristor anode. At the termination of this inductive transient pulse the plate of the capacitor connected to the anode returns immediately to the voltage of the battery positive driving the other plate of the capacitor to a voltage below battery negative by an amount equal to the amplitude of the inductive transient voltage which on commutation appeared at the anode of thyristor 1. The voltage at the wiper arm 33 also goes below the battery negative voltage so that the voltage differential between the wiper arm 33 and the emitter of transistor 25 increases. If this voltage differential increases to a value in excess of the breakover voltage of the zener diode 24, the voltage at the emitter of NPN-transistor 25 falls relative to its base voltage and transistor 25 is turned on and effectively short-circuits capacitor 14 thereby holding oscillator 9 quiescent. Capacitor 21 now discharges by way of resistor 31 so that the voltage at wiper arm 33 rises and the voltage differential between the wiper arm 23 and the emitter of transistor 25 falls until transistor 25 switches off and pulsing of the relaxation oscillator 9 recommences. The rate at which the potential of the plate of capacitor 21 connected to the diode 30 rises to that of battery negative depends on the time constant of capacitor 21 and resistor 31 and also on the magnitude of the voltage impressed, by the inductive pulse appearing at the anode of thyristor 1 on commutation thereof, on the capacitor 21. It will be apparent that the diode 30 enables the capacitor plate connnected therewith to fall to a potential below that of battery negative.

The advantage of the circuit shown in FIG. 2 compared with that of FIG. 1 is that the conduction of transistor 25 in FIG. 2 and therefore the period by which the next firing pulse from the oscillator 9 to the thyristors 1 and 7 is delayed, is determined by the voltage swing on the plate of capacitor 21 connected to diode 30. This voltage swing is equal to the amplitude of the inductive voltage transient pulse appearing at the anode of thyristor 1 upon commutation thereof and the amplitude of this pulse depends directly on the load current flowing immediately prior to commutation of thyristor 1. In FIG. 1 it is the voltage to which the plate of capacitor 21 which is connected with diode 20 is charged on commutation of the main switching thyristor 1 which determines whether and for how long the next pulse to the gate of the thyristor 1 from the relaxation oscillator 9 is delayed. The voltage at the plate of the capacitor 21 connected with diode 20 on commutation of thyristor 1 is equal to battery positive voltage plus the voltage of the transient pulse at the anode of thyristor 1. The delay in firing of the next pulse to the gate of thyristor 1 is thus dependent upon the sum of the battery voltage and the amplitude of the voltage transient pulse at the anode of thyristor 1 on commutation thereof. Since the voltage of the transient pulse is determined by the load current flowing on commutation, it will be appreciated that the circuit of FIG. 1 provides a delay of the next pulse supplied to the gate electrode of thyristor 1 which is less directly related to the load current flowing on commutation of thyristor 1 than is the case of the circuit arrangement of FIG. 2.

Figure 3:
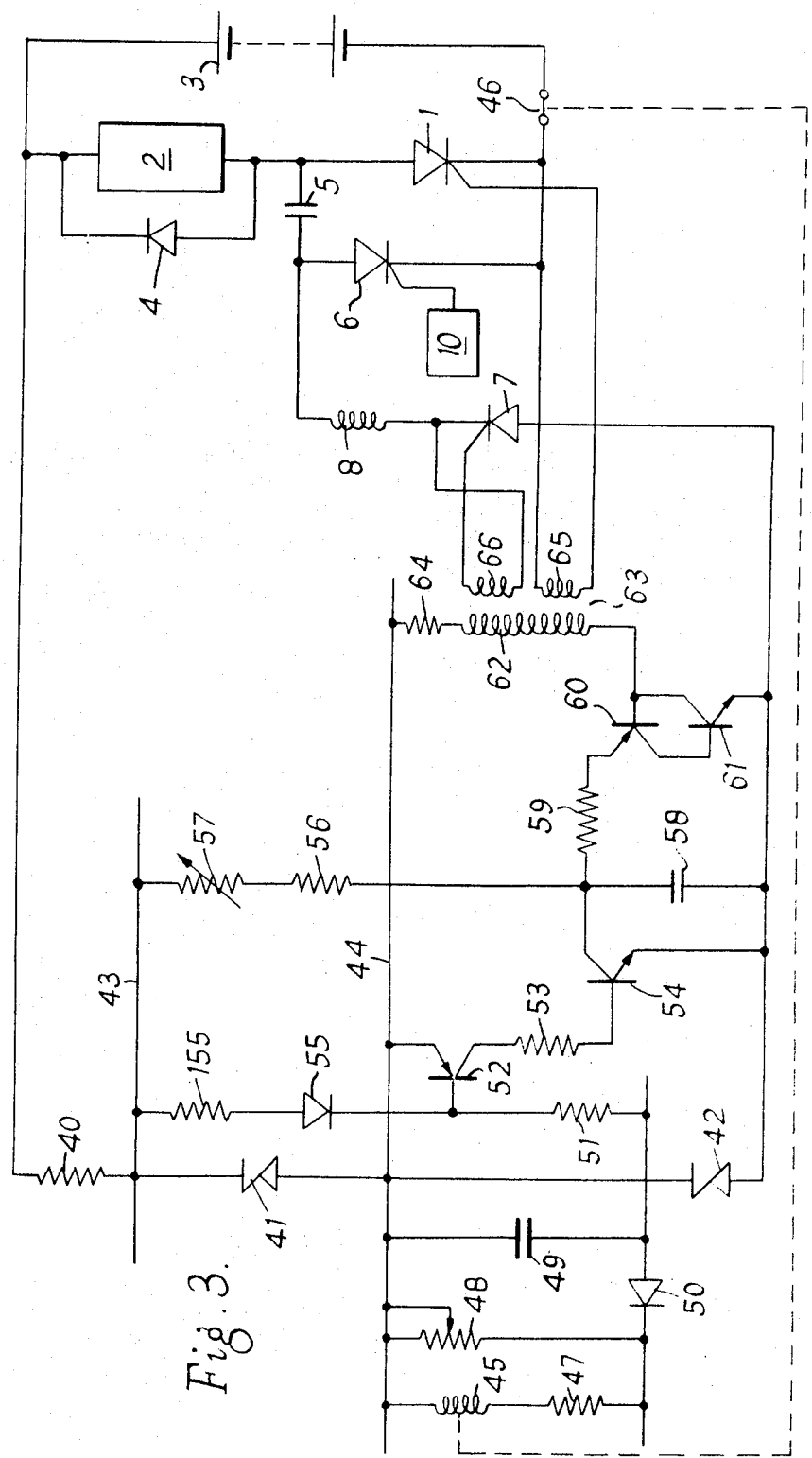
FIG. 3 is a circuit diagram of a further embodiment of the invention.

Referring now to FIG. 3, a resistor 40 in series with zener diodes 41 and 42 having the same breakover voltage is connected across the battery 3 to provide rails 43 and 44 at stabilized voltages below the battery voltage, rail 43 being at twice the voltage of rail 44. A multiturn pickup coil 45 is placed in close proximity to a current-carrying conducting link 46 in the negative line of the battery which carries full battery current. The inductive voltage which appears in the load-current-carrying circuit on commutation of the main switching thyristor is produced by the self-inductance of the battery and also by the distributed circuit inductance including the inductance of the battery leads. Each section of the battery leads contributes to the inductive voltage appearing on commutation of thyristor 1 and momentarily a voltage, however small, appears across each section of the battery leads and in particular across the link 46. By transformer action the voltage change across the link 46 induces a magnified voltage between the ends of the coil 45. Connected in series with coil 45 are a fixed resistor 47 and a preset resistor 48 which attenuate the induced voltage developed across the coil 45 and the voltage dropped across the part of the preset resistor 48 which is in circuit is applied to a capacitor 49 connected across resistor 48 in series with a diode 50.

The coil 45 is orientated so that when an inductive voltage transient in the link or shunt 46 induces a voltage in the coil 45, the end of the coil connected to resistor 47 goes negative relative to the other end of the coil and the diode 50 is thus forward biased so that the capacitor 49 is charged with its plate connected to diode 50 negative with respect to its plate connected to rail 44. The common point of diode 50 and capacitor 49 is connected by way of resistor 51 to the base of PNP-transistor 52 which has its emitter connected to the rail 44 and its collector connected by way of resistor 53 to the base of NPN-transistor 54. The base of transistor 52 is also connected via a diode 55 and resistor 155 to voltage rail 43. It will be appreciated that as capacitor 49 is charged as a consequence of a voltage impulse appearing across coil 45 the base of transistor 52 goes increasingly negative and transistor 52 is thereby switched into conduction provided, of course, the amplitude of the induced voltage transient on coil 45 and the voltage therefore to which capacitor 49 charges exceeds a predetermined value. The duration of conduction of transistor 52 depends also on the voltage to which the capacitor 49 is charged by the transient induced voltage of coil 45.

The emitter of transistor 54 is connected to battery negative and across the emitter and collector of transistor 54 is connected a capacitor 58 which is charged from rail 43 by way of resistors 56 and 57, resistor 57 being variable and in the case of a battery electric vehicle operated suitably from a foot pedal of the vehicle. Variation of resistor 57, as will be seen, varies the frequency of pulses to the gate electrode of thyristor 1. It will be appreciated that conduction of transistor 52 drives the base of transistor 54 positive thus turning that transistor into conduction and thereby providing a short circuit across capacitor 58 which is connected between the collector and emitter of transistor 54 and which is charged via resistors 56 and 57.

The common point of collector of transistor 54 and capacitor 58 is connected via a resistor 59 to the emitter of PNP-transistor 60 the base and collector of which are connected respectively to the collector and base of an NPN-transistor 61 the emitter of which is connected to the battery negative rail. The base of transistor 60 is connected by way of the primary winding 62 of a pulse transformer 63 and a resistor 64 to the voltage rail 44. The pulse transformer 63 has two secondary windings 65 and 66 which are connected respectively between the gate and cathode electrodes of thyristors 1 and 7.

It will be apparent that the circuit components 56 to 66 comprise a relaxation oscillator which unless it is held quiescent by conduction of transistor 54 provides pulses in the primary winding of transformer 62 and, therefore, at the gate electrodes of thyristors 1 and 7. A pulse appears in the primary winding transformer 62 each time the charge on capacitor 58 exceeds a predetermined value which makes the emitter of transistor 60 sufficiently positive with respect to its base to switch transistor 60 into conduction with the result that the base of transistor 61 goes increasingly positive with respect to its emitter so switching transistor 61 in conduction. The capacitor 58 thus discharges rapidly via transistors 60 and 61 the collector current drawn by transistor 61 provides a pulse in the primary and corresponding induced pulses in the secondary windings of transformer 62. The frequency of these pulses depends on the frequency of conduction of transistors 60 and 61 and this in turn depends, provided transistor 54 is not conducting, on the time taken to charge capacitor 58 to the level required to switch on transistors 60 and 61. The charging time of capacitor 58 depends on the setting of resistor 57. As the resistance of resistor 57 which is in series with capacitor 58 is decreased the rate of charge of capacitor 58 increases and so therefor does the frequency of pulses at the gate electrodes of thyristors 1 and 7.

In operation of the circuit of FIG. 3, whenever the thyristor 1 is commutated an inductive voltage appears across the ends of the link or shunt 46 which is of magnitude dependent upon the current flowing therethrough immediately prior to commutation and this value of current therefore determines the magnitude of the transient voltage which by transformer action appears on the pickup coil 45. The level of the voltage to which the capacitor 49 is charged by the transient voltage on coil 45 depends on the amplitude of the transient voltage and if the voltage to which capacitor 49 is thus charged exceeds a predetermined value transistor 52 is switched into conduction for a period which depends on the voltage level in excess of the predetermined value reached by the charging of capacitor 49. The higher the voltage level to which the capacitor 49 charges, the longer the time it takes for the charge to be dissipated to a value below the predetermined level. When transistor 52 conducts it switches transistor 54 into conduction and transistor 54 then provides a short circuit path across capacitor 58 which prevents charging of that capacitor via resistors 56 and 57. So long as charging of capacitor 58 is thus prevented the relaxation oscillator provided by components 56 to 66 is held quiescent and the next pulses to the gate electrodes of thyristors 1 and 7 are delayed so that the mean current through the load 2 is reduced. The delay of pulses to the thyristors 1 and 7 is terminated upon transistor 54 being rendered nonconducting and this in turn depends upon transistor 52 being turned off. The latter transistor is switched off when the charge on capacitor 49 has fallen to a predetermined level. The refiring of thyristors 1 and 7 followed by the subsequent commutation of thyristor 1 creates a further voltage impulse across the pickup coil 45 which, if the magnitude thereof is below a predetermined level fails to charge capacitor 49 sufficiently to effect turning on of transistors 52 and 54 and therefore suppression of output of the relaxation oscillator. If the magnitude of the pulse impressed on pickup coil 45 is, however, sufficient to charge capacitor 49 above the predetermined level conduction of transistors 52 and 54 will again occur with the result that the next pulses to the gate electrodes of thyristors 1 and 7 will again be delayed. It is apparent, therefore, that delay of pulses to thyristors 1 and 7 will only occur if the current flowing through thyristor 1 immediately prior to commutation thereof is in excess of a certain value namely the current limit value. It will be apparent that the pickup coil 45, resistors 47 and 48, capacitor 49, and diode 50, provide a voltage-sensing circuit which senses an inductive voltage arising on commutation of thyristor 1 while transistors 52 and 54 and their associated circuit components act as a control circuit for limiting the load current when the inductive voltage sensed by the coil 45 exceeds a predetermined value.

The circuit of FIG. 3 is less affected than the circuits of FIGS. 1 and 2 by battery voltage fluctuations arising from loads other than the load 2 on the battery.

Instead of using the multiturn pickup coil, an AC amplifier can be connected across the shunt 46 the output of which is developed across an impedance in the position in FIG. 3 of the coil 45.

The circuits of FIGS. 1, 2 and 3 have in common the feature that limitation of current in the battery circuit is effected by adjusting the frequency of pulses supplied to thyristor 1.

Figure 4:
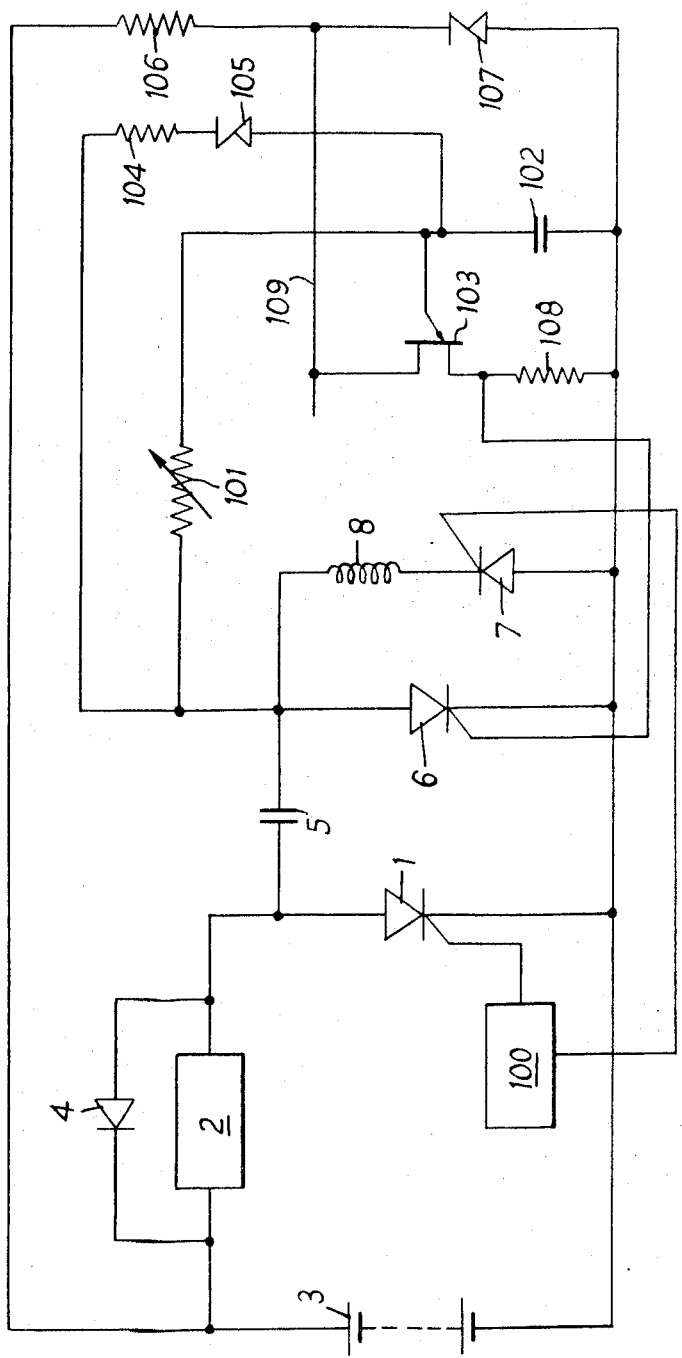
FIG. 4 is a circuit diagram of yet another form of the invention.

In the circuit of FIG. 4 now about to be described, current limitation is effected by controlling duration of the periods of conduction of thyristor 1, that is to say controlling the pulse width of current pulses through thyristor 1.

It will be understood that the circuit of FIG. 3 could be used as a means of controlling the oscillator 10 instead of controlling the oscillator supplying pulses to thyristors 1 and 7. However, where the oscillator 10 is controlled the firing of thyristor 6 has to be advanced in order to reduce the mean current flowing through the load 2 rather than delayed as is the case when thyristors 1 and 7 are controlled.

In FIG. 4 there is illustrated an alternative way of controlling the oscillator 10 from the way indicated for the control of the oscillator supplying pulses to thyristors 1 and 7 of FIG. 3.

Referring now to FIG. 4, the oscillator for controlling thyristors 1 and 7 is depicted generally by the reference 100. Between the anode of thyristor 6 and the negative side of the battery is connected in series a variable resistor 101 and a capacitor 102 to the common point of which is connected the emitter of a unijunction transistor 103. The variable resistor 101 in the case of a battery-operated vehicle is actuated by the foot control of the vehicle. From the anode of thyristor 6 to the emitter of unijunction transistor 103 is also connected a resistor 104 in series with a zener diode 105. One of the base electrodes of unijunction transistor 103 is directly connected to a rail 109 which is held at a voltage below the battery voltage by means of a network connected across the battery terminals consisting of a resistor 106 in series with a zener diode 107. The other base electrode is connected by way of a resistor 108 to the negative side of the battery and is also directly connected to the gate electrode of thyristor 6.

In operation of the circuit, when, as a result of firing of thyristors 1 and 7, the voltage to which capacitor 5 had forward charged as a result of the previous firing of thyristor 6, is reversed, the capacitor 102 is charged by way of variable resistor 101 at a rate dependent upon the setting of resistor 101. When the voltage level of capacitor 102 reaches a predetermined value the capacitor is discharged through the unijunction transistor 103 and a pulse is thus supplied to the gate of thyristor 6. The time at which this pulse is supplied to the gate of thyristor 6, and therefore the duration of conduction of thyristor 1, will depend, when the mean current through the load 2 is below its limiting value, on the setting of variable resistor 101. When the current flowing through thyristor 1 on commutation of that thyristor exceeds a predetermined limiting value, the voltage to which capacitor 5 is first forward-charged and then reverse-charged is increased to a level at which the differential voltage between the anode of thyristor 6 and the emitter of unijunction transistor 103 exceeds the breakover voltage if zener diode 105, with the result that capacitor 102 is charged via resistor 104 and zener diode 105 at a rate more quickly than it is charged via variable resistor 101. Accordingly, capacitor 102 discharges earlier through unijunction transistor 103 and the time at which the next pulse is supplied to the gate of thyristor 6 is advanced so that commutation of thyristor 1 is also advanced and the mean current through thyristor 1 is reduced by reason of the duration of the period of conduction of thyristor 1 being reduced.

I claim:

1. A static switching controller for effecting repetitive connection and disconnection between a load and a DC source, said load being coupled to said source partially by means of leads, said load and source possessing inductance, said controller comprising:

thyristor means, coupled between said source and load for providing a path for the flow of current between said source and load when said thyristor means is rendered conducting, the periods of conduction of the thyristor means determining the mean current through said load, a commutating capacitor coupled to said thyristor means for reverse-biasing said thyristor means whereby it is switched to a nonconducting state, said capacitor being charged in a first direction by said source, sensing means coupled to said thyristor means for sensing a voltage dependent upon the current passing through the thyristor means on commutation thereof, and control circuit means, responsive to said sensed voltage when said sensed voltage exceeds a predetermined value, for reducing the conducting to nonconducting time of the thyristor means to effect limitation of the mean current flowing through the load.

2. A controller as claimed in claim 1, wherein the sensing means are adapted to sense a transient voltage in the circuit of the load, the DC source and the thyristor means on commutation of the thyristor means.

3. A controller as claimed in claim 1, wherein the sensing means are adapted to sense the transient voltage at the anode of the thyristor means on commutation of the thyristor means.

4. A controller as claimed in claim 14, wherein the sensing means are adapted to sense the difference between the transient voltage at the anode of the thyristor means on commutation of the thyristor means and the voltage of the DC source.

5. A controller as claimed in claim 1 and having means for reversing the charge on the commutating capacitor relative to said first direction, means for preventing decay of charge on the commutating capacitor and further thyristor means which are rendered conducting to discharge said reversed charge on the commutating capacitor to commutate the thyristor means connecting the load to the DC source, wherein the sensing means are adapted to sense the voltage of the reversed charge on the commutating capacitor.

6. A controller as claimed in claim 2, wherein the circuit elements are adapted, when the voltage sensed by the sensing means exceeds said predetermined value, to operate so as to delay conduction of the thyristor means.

7. A controller as claimed in claim 2, wherein the circuit elements are adapted, when the voltage sensed by the sensing means exceeds said predetermined value, to operate so as to advance the commutation of the thyristor means.

8. A controller as claimed in claim 2, wherein the sensing means includes a multiturn coil disposed in close proximity to a section of the leads of the DC source, and wherein said control circuit means includes an oscillator means coupled to said thyristor means for supplying repetitive pulses to render said thyristor means conductive, wherein the voltage induced in the coil on commutation of the thyristor means when in excess of a predetermined value is employed to operate said control circuit means to so control the pulsing frequency of said oscillator as to reduce the conducting to nonconducting time of the thyristor means.

9. A controller as claimed in claim 8, wherein the oscillator is so controlled as to delay the succeeding pulse to said thyristor means connecting the load to the DC source.

10. A controller as claimed in claim 9, wherein there are provided means for reversing the charge on the commutating capacitor relative to said first direction, means for preventing decay of charge on the commutating capacitor and, further thyristor means which are rendered conducting to discharge said reversed charge on the commutating capacitor to thereby commutate the thyristor means connecting the load to the DC source.

11. A controller as claimed in claim 8 and having means for reversing the charge on the commutating capacitor relative to said first direction, means for preventing decay of charge on the commutating capacitor of further thyristor means which are rendered conducting to discharge said reversed charge on the commutating capacitor to thereby commutate the thyristor means connecting the load to the DC source wherein the oscillator is so controlled as to advance the succeeding pulse to said further thyristor means.

* * * * *